(12) United States Patent
Yamine

(10) Patent No.: US 12,207,152 B2
(45) Date of Patent: Jan. 21, 2025

(54) METHODS FOR MAINTAINING AN ONGOING COMMUNICATION EVEN AFTER SITE OUTAGE

(71) Applicant: Telefonaktiebolaget LM Ericsson (PUBL), Stockholm (SE)

(72) Inventor: Badawi Yamine, Beirut (LB)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 245 days.

(21) Appl. No.: 17/634,852

(22) PCT Filed: Aug. 14, 2019

(86) PCT No.: PCT/SE2019/050746
§ 371 (c)(1),
(2) Date: Feb. 11, 2022

(87) PCT Pub. No.: WO2021/029796
PCT Pub. Date: Feb. 18, 2021

(65) Prior Publication Data
US 2022/0286934 A1     Sep. 8, 2022

(51) Int. Cl.
*H04W 36/30* (2009.01)
*H04W 36/00* (2009.01)
*H04W 76/19* (2018.01)

(52) U.S. Cl.
CPC ..... *H04W 36/305* (2018.08); *H04W 36/0033* (2013.01); *H04W 36/0061* (2013.01); *H04W 76/19* (2018.02)

(58) Field of Classification Search
CPC ........... H04W 36/305; H04W 36/0033; H04W 36/0061; H04W 76/19; H04W 36/30; H04W 36/302; H04W 36/304
See application file for complete search history.

(56) References Cited

U.S. PATENT DOCUMENTS

| 8,831,555 | B2 | 9/2014 | Umatt et al. |
| 10,123,373 | B1 * | 11/2018 | Wasalwar ............. H04W 76/19 |
| 10,912,004 | B2 * | 2/2021 | Abouelmaati ........ H04W 24/04 |
| 2008/0119191 | A1 | 5/2008 | Feigen et al. |

(Continued)

FOREIGN PATENT DOCUMENTS

| EP | 3 174 360 A1 | 5/2017 |
| WO | 2016 150478 A1 | 9/2016 |
| WO | WO-2018128571 A1 * | 7/2018 ............ H04W 36/08 |

OTHER PUBLICATIONS

3GPP TS 36.304 v15.4.0; Technical Specification; 3rd Generation Partnership Project; Technical Specification Group Radio Access Network; Evolved Universal Terrestrial Radio Access (E-UTRA); User Equipment (UE) procedure in idle mode (Release 15)—Jun. 2019.

(Continued)

*Primary Examiner* — Un C Cho
*Assistant Examiner* — Lalita W Pace
(74) *Attorney, Agent, or Firm* — Weisberg I.P. Law, P.A.

(57) ABSTRACT

An entity in a wireless network 100 retains contexts for each wireless terminal 140 served by a serving cell in a serving Radio Node (RN) 110 after that serving cell experiences an outage. The contexts may be retained by the serving RN 110 of the serving cell and/or by the wireless terminal served by the serving cell. The retained contexts are then provided to neighbor RNs 120 to facilitate connection reestablishment for the wireless terminals 140 previously served by the serving cell now experiencing an outage with a neighbor cell, e.g., another cell in the serving RN 110 or a neighbor cell in a neighbor RN 120.

13 Claims, 10 Drawing Sheets

(56) References Cited

U.S. PATENT DOCUMENTS

| | | | |
|---|---|---|---|
| 2011/0028181 A1 | 2/2011 | Byun et al. | |
| 2011/0053588 A1* | 3/2011 | Al-Khudairi | H04W 36/305 |
| | | | 455/424 |
| 2012/0083262 A1* | 4/2012 | Dimou | H04W 36/0079 |
| | | | 455/423 |
| 2012/0094656 A1 | 4/2012 | Huang et al. | |
| 2013/0182563 A1 | 7/2013 | Johansson et al. | |
| 2014/0179325 A1 | 6/2014 | Xu et al. | |
| 2016/0007243 A1 | 1/2016 | Park et al. | |
| 2016/0285679 A1 | 9/2016 | Dudda et al. | |
| 2022/0038965 A1* | 2/2022 | Wang | H04W 76/19 |

OTHER PUBLICATIONS

3GPP TS 36.331 v15.5.0; Technical Specification; 3rd Generation Partnership Project; Technical Specification Group Radio Access Network; Evolved Universal Terrestrial Radio Access (E-UTRA); Radio Resource Control (RRC); Protocol specification (Relase 15)—Mar. 2019.

3GPP TS 36.331 v15.5.1; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Apr. 2019.

3GPP TS 36.304 v15.4.0; Technical Specification; 3rd Generation Partnership Project; Technical Specification Group Radio Access Network; Evolved Universal Terrestrial Radio Access (E-UTRA); User Equipment (UE) procedures in idle mode (Release 15)—Jun. 2019.

PCT International Search Report issued for International application No. PCT/SE2019/050746—Oct. 9, 2019.

PCT Written Opinion of the International Searching Authority issued for International application No. PCT/SE2019/050746—Oct. 9, 2019.

* cited by examiner

METHODS FOR MAINTAINING AN ONGOING COMMUNICATION EVEN AFTER SITE OUTAGE

PRIORITY

This nonprovisional application is a U.S. National Stage Filing under 35 U.S.C. § 371 of International Patent Application Serial No. PCT/SE2019/050746 filed Aug. 14, 2019 and entitled "METHODS FOR MAINTAINING AN ONGOING COMMUNICATION EVEN AFTER SITE OUTAGE" which is hereby incorporated by reference in its entirety.

TECHNICAL FIELD

The solution presented herein generally relates to wireless communications, and more particularly relates to maintaining communication sessions after an outage occurs in the serving cell.

BACKGROUND

Every electronic equipment, at some point in time, will experience an outage. Unexpected outages represent one type of outage, where the outage occurs unexpectedly due to the equipment's software and/or hardware failing unexpectedly. Expected outages represent another type of outage, where the outage occurs when the corresponding software and/or hardware is disabled to allow implementation of some type of software and/or hardware maintenance, upgrade, etc.

When an outage occurs in a serving cell providing wireless communications to one or more wireless terminals, provisions must be made to maintain those wireless connections to prevent those wireless communications from being dropped. Conventional networks typically rely on the execution of handover or other call maintenance procedures before the outage occurs. For example, before an expected outage occurs, a serving cell may handover all wireless terminals to another cell before the expected outage to avoid call failures for those wireless terminals served by the serving cell. Such handover solutions are not generally applicable for unexpected outages due the lack of warning preceding the outage. The serving cell may alternatively provide the information necessary to maintain the wireless communications to another cell in anticipation of a possible outage, e.g., periodically, regardless of whether an outage is expected. Such techniques require extensive signaling overhead, however, where much of that signaling overhead is wasted.

Thus, there remains a need for improved ways of handling outages, particularly unexpected outages.

SUMMARY

The solution presented herein retains contexts for each wireless terminal served by a serving cell after that serving cell experiences an outage. The contexts may be retained by the serving Radio Node (RN) of the serving cell and/or by the wireless terminal served by the serving cell. The retained contexts are then provided to neighbor RNs to facilitate connection reestablishment, for the wireless terminals previously served by the serving cell now experiencing an outage, with a neighbor cell, e.g., another cell in the serving RN or a neighbor cell in a neighbor RN.

One exemplary embodiment comprises a method of maintaining wireless communications after a cell outage in a wireless network comprising a serving Radio Node (RN) and neighbor RNs. The method is implemented by the serving RN and comprises, in response to an outage of a serving cell in the serving RN, retaining a context for each of one or more active wireless terminals served by the serving cell before the outage. Each context comprises information used to maintain wireless communications in the wireless network for a specific one of the active wireless terminals. The method further comprises providing at least one of the retained contexts to at least one of the neighbor RNs to facilitate connection reestablishment between the corresponding active wireless terminal and a neighbor cell of the serving RN or the neighbor RNs.

Another exemplary embodiment comprises a serving Radio Node (RN) for wireless communication in a wireless network. The serving RN comprising a processing circuit configured to, in response to an outage of a serving cell in the serving RN, retain a context for each of one or more active wireless terminals served by the serving cell before the outage. Each context comprises information used to maintain wireless communications in the wireless network for a specific one of the active wireless terminals. The processing circuit is further configured to provide at least one of the retained contexts to at least one of the neighbor RNs to facilitate connection reestablishment between the corresponding active wireless terminal and a neighbor cell of the serving RN or the neighbor RNs.

Another exemplary embodiment comprises a computer program product for controlling a serving Radio Node (RN) in a wireless network. The computer program product comprises software instructions which, when run on at least one processing circuit in the serving RN, causes the serving RN to, in response to an outage of a serving cell in the serving RN, retain a context for each of one or more active wireless terminals served by the serving cell before the outage. Each context comprises information used to maintain wireless communications in the wireless network for a specific one of the active wireless terminals. The software instructions, when run on the at least one processing circuit, further causes the serving RN to provide at least one of the retained contexts to at least one of the neighbor RNs to facilitate connection reestablishment between the corresponding active wireless terminal and a neighbor cell of the serving RN or the neighbor RNs. A computer-readable medium may comprise the computer program product, where the computer-readable medium may comprise a non-transitory computer readable medium.

Another exemplary embodiment comprises a method of maintaining wireless communications after a cell outage in a wireless network comprising a serving Radio Node (RN) and a neighbor RN. The method is implemented by the neighbor RN and comprises, in response to an outage of a serving cell in the serving RN, obtaining from the serving RN a context for each of one or more active wireless terminals served by the serving cell before the outage. Each context comprises information used to maintain wireless communications in the wireless network for a specific one of the active wireless terminals. The method further comprises implementing connection reestablishment with at least one of the one or more active wireless terminals using the obtained corresponding context.

Another exemplary embodiment comprises a neighbor Radio Node (RN) in a wireless network comprising a serving RN and the neighbor RN. The neighbor RN comprises a processing circuit configured to, in response to an outage of a serving cell in the serving RN, obtain from the serving RN a context for each of one or more active wireless terminals served by the serving cell before the outage. Each context comprises information used to maintain wireless communications in the wireless network for a specific one of the active wireless terminals. The processing circuit is further configured to implement connection reestablishment with at least one of the one or more active wireless terminals using the obtained corresponding context.

Another exemplary embodiment comprises a computer program product for controlling a neighbor Radio Node (RN) in a wireless network. The computer program product comprises software instructions which, when run on at least one processing circuit in the neighbor RN, causes the neighbor RN to, in response to an outage of a serving cell in the serving RN, obtain from the serving RN a context for each of one or more active wireless terminals served by the serving cell before the outage. Each context comprises information used to maintain wireless communications in the wireless network for a specific one of the active wireless terminals. The software instructions, when run on the at least one processing circuit, further cause the neighbor RN to implement connection reestablishment with at least one of the one or more active wireless terminals using the obtained corresponding context. A computer-readable medium may comprise the computer program product, where the computer-readable medium may comprise a non-transitory computer readable medium.

Another exemplary embodiment comprises a method of maintaining wireless communications after a cell outage in a wireless network comprising a serving Radio Node (RN) and neighbor RNs. The method is implemented by an active wireless terminal served by a serving cell in the serving RN and comprises responsive to determining an outage of the serving cell in the serving RN, starting a context timer in the active wireless terminal. The context timer has a duration less than a radio link failure timer controlled by the wireless network. Responsive to expiration of the context timer, the method further comprises storing a context comprising information specific to the active wireless terminal used to maintain wireless communications in the wireless network, and triggering connection reestablishment with a neighbor cell in the serving RN or a neighbor RN using the stored context.

Another exemplary embodiment comprises a wireless terminal served by a serving cell in a serving RN. The wireless terminal comprises a processing circuit configured to, responsive to determining an outage of the serving cell in the serving RN, starting a context timer in the active wireless terminal. The context timer has a duration less than a radio link failure timer controlled by the wireless network. Responsive to expiration of the context timer, the processing circuit is further configured to store a context comprising information specific to the active wireless terminal used to maintain wireless communications in the wireless network, and trigger connection reestablishment with a neighbor cell in the serving RN or a neighbor RN using the stored context.

Another exemplary embodiment comprises a computer program product for controlling a wireless terminal served by a serving cell in a serving RN in a wireless network. The computer program product comprises software instructions which, when run on at least one processing circuit in the wireless terminal, causes the wireless terminal to, responsive to determining an outage of the serving cell in the serving RN, start a context timer in the active wireless terminal. The context timer has a duration less than a radio link failure timer controlled by the wireless network. Responsive to expiration of the context timer, the software instructions, when run on the at least one processing circuit, further causes the wireless terminal to store a context comprising information specific to the active wireless terminal used to maintain wireless communications in the wireless network, and trigger connection reestablishment with a neighbor cell in the serving RN or a neighbor RN using the stored context. A computer-readable medium may comprise the computer program product, where the computer-readable medium may comprise a non-transitory computer readable medium.

Another exemplary embodiment comprises a method of maintaining wireless communications after a cell outage in a wireless network. The method is implemented by an Operating Support System (OSS) supporting a serving RN and neighbor RNs, and comprises, in response to an outage of a serving cell in the serving RN, receiving from the serving RN a context for each of one or more active wireless terminals served by the serving cell before the outage. Each context comprises information used to maintain wireless communications in the wireless network for a specific one of the active wireless terminals. The method further comprises providing at least one of the received contexts to at least one of the neighbor RNs to facilitate connection reestablishment between the corresponding active wireless terminal and a neighbor cell of the serving RN or the neighbor RNs.

Another exemplary embodiment comprises an Operating Support System (OSS) supporting a serving Radio Node (RN) and adjacent neighbor RNs. The OSS comprises a processing circuit configured to, in response to an outage of a serving cell in the serving RN, receive from the serving RN a context for each of one or more active wireless terminals served by the serving cell before the outage. Each context comprises information used to maintain wireless communications in the wireless network for a specific one of the active wireless terminals. The processing circuit is further configured to provide at least one of the received contexts to at least one of the neighbor RNs to facilitate connection reestablishment between the corresponding active wireless terminal and a neighbor cell of the serving RN or the neighbor RNs.

Another exemplary embodiment comprises a computer program product for controlling an Operating Support System (OSS) supporting a serving Radio Node (RN) and neighbor RNs in a wireless network. The computer program product comprises software instructions which, when run on at least one processing circuit in the OSS, causes the OSS to, in response to an outage of a serving cell in the serving RN, receive from the serving RN a context for each of one or more active wireless terminals served by the serving cell before the outage. Each context comprises information used to maintain wireless communications in the wireless network for a specific one of the active wireless terminals. The software instructions, when run on the at least one processing circuit, further causes the OSS to provide at least one of the received contexts to at least one of the neighbor RNs to facilitate connection reestablishment between the corresponding active wireless terminal and a neighbor cell of the serving RN or the neighbor RNs. A computer-readable medium may comprise the computer program product, where the computer-readable medium may comprise a non-transitory computer readable medium.

DETAILED DESCRIPTION

The solution presented herein facilitates the maintenance of current wireless communications after a cell outage in a wireless network comprising a serving Radio Node (RN) adjacent to neighbor RNs, regardless of whether the outage is expected or unexpected. More particularly, in response to an outage of a serving cell in the serving RN, the serving RN retains a context for each active wireless terminal served before the outage by the serving cell, where each context comprises information used to maintain wireless communications in the wireless network for a specific one of the active wireless terminals. The serving RN further provides at least one of the retained contexts to at least one of the neighbor RNs to facilitate connection reestablishment between the corresponding active wireless terminal and one cell of the neighbor RNs. As a result, the solution presented herein enables the active wireless terminals to reestablish the connection with the network via a neighbor RN, while also significantly reducing signaling overhead by only providing the contexts in response to the outage.

Figure 1:
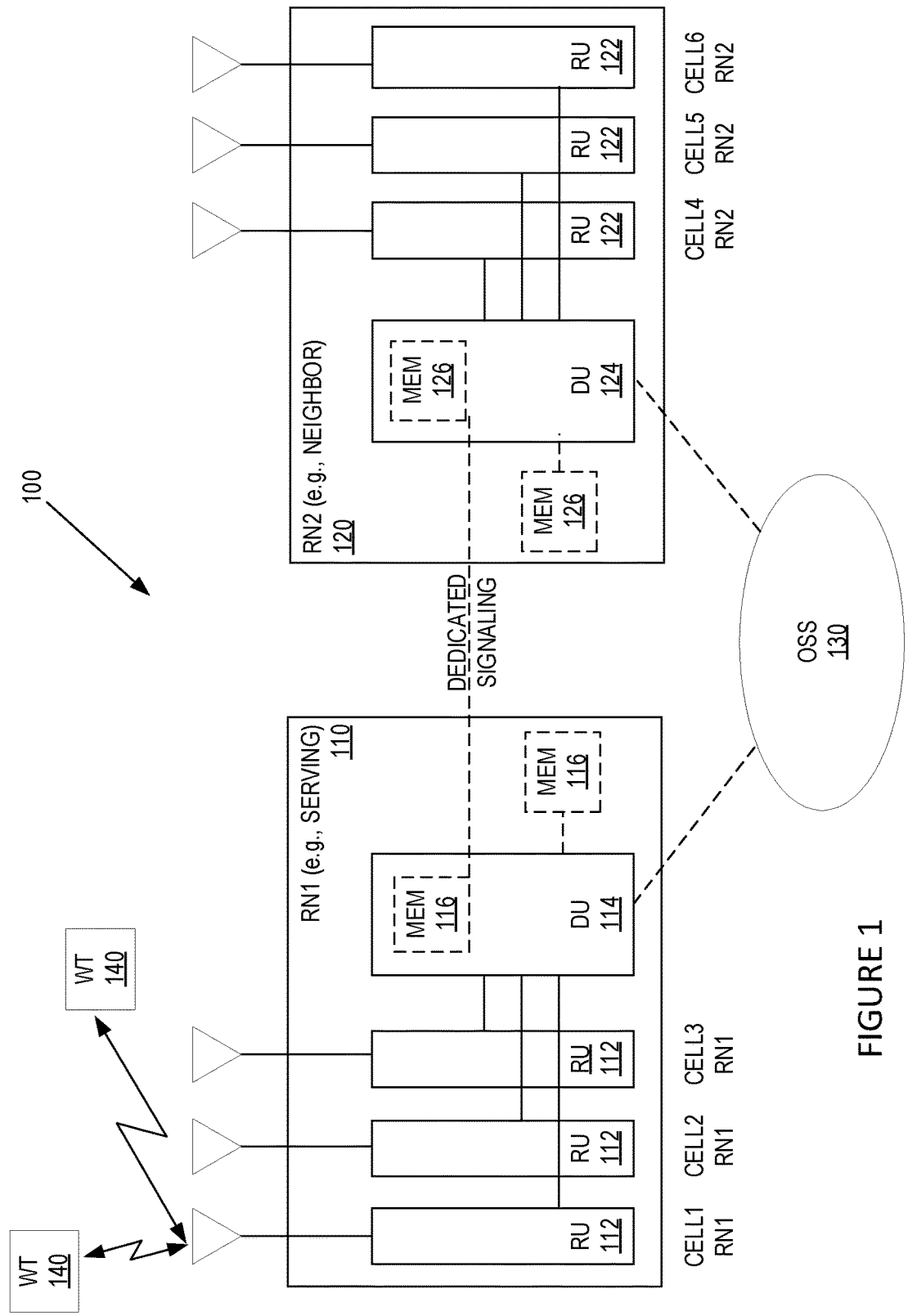
FIG. 1 shows an exemplary wireless network.

Before providing further details regarding the solution presented herein, the following first describes an exemplary network to which the solution presented herein applies. FIG. 1 shows an exemplary wireless network 100 comprising a serving RN 110, a neighbor RN 120, and an Operating Support System 130. Each RN 110, 120 includes a Digital Unit (DU) 114, 124 and multiple Radio Units (RUs) 112, 122. Each RU 112, 122 handles the radio communications for the corresponding cell. For example, each RU 112, 122 converts a received analog signal (from a wireless terminal) into a digital signal to be processed by the RN 110, 120, converts a digital signal from the RN 110, 120 into an analog signal for transmission to the corresponding wireless terminal over the air interface, operates as a power amplifier to amplify the analog signal for transmission to the wireless terminal, etc. Each DU 114, 124 performs the remaining functions of the RN 110, 120, e.g., processes all signals related to a connection at all protocol layers, handles connection establishment, connection reestablishment, ciphering, mobility, scheduling, etc. As shown in FIG. 1, each RU 112, 122 corresponds to a different cell, e.g., cell1, cell2, and cell3, respectively. It will be appreciated however, that while each cell corresponds to at least one RU 112, 122, some cells may correspond to multiple RUs 112, 122. For example, to provide more radio power for a particular cell, that particular cell may comprise more than one RU 112, 122. As such, the one RU 112, 122 per cell of FIG. 1 is exemplary and is not limiting, and is presented for simplicity reasons only.

Figure 2:
FIG. 2 shows exemplary cells and cell coverage areas.

To continue the example of FIG. 1, FIG. 2 shows an exemplary cell coverage area for each of the cells in FIG. 1, where cell1-cell3 are part of the serving RN 110, and cell4-cell6 are part of a neighbor RN 120. The cell coverage area is also covered by an additional cell according to an early RAT, e.g., 4G. If cent which serves one or more active wireless terminals 140 (not shown in FIG. 2), experiences an outage, these wireless terminals 140 must reestablish a connection with a neighbor cell from the serving RN 110 or a neighbor RN 120, to avoid losing a connection with the network 100.

Figure 3:
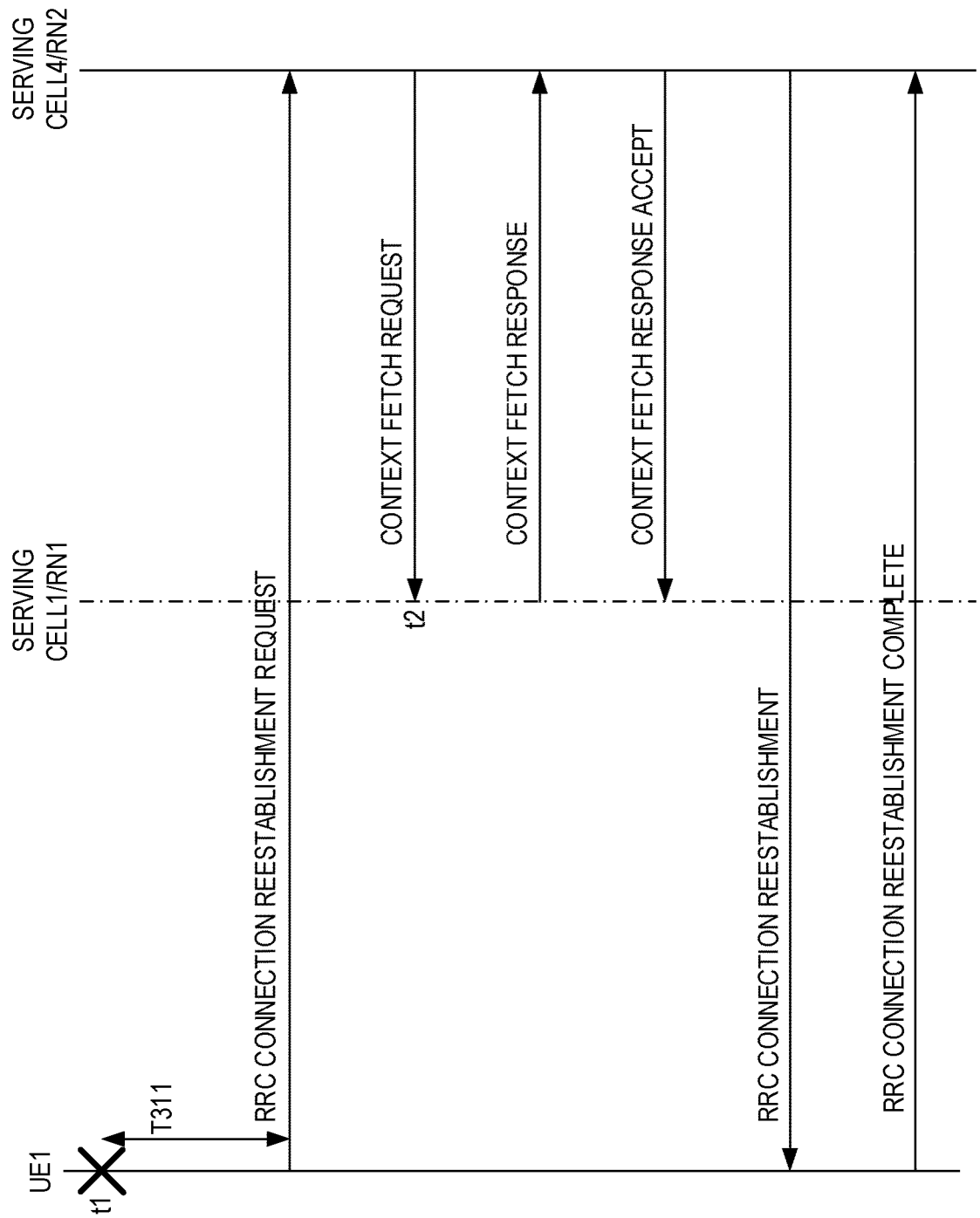
FIG. 3 shows an exemplary connection reestablishment process.

FIG. 3 shows an exemplary connection reestablishment procedure according conventional techniques. When a wireless terminal (e.g., User Equipment 1, UE1) loses its radio connection with a cell of the serving RN, e.g., cent UE 1 starts a timer T311, which is defined by the network. To prevent UE1 from going into idle mode, UE1 looks for a suitable neighbor cell with which to reestablish its call before the timer T311 expires. The call reestablishment may be attempted with the serving cell, e.g., cell1 in our example. However, the UE1 may attempt to reestablish the connection with a neighbor cell in a neighboring RN. When UE1 attempts the connection reestablishment with the neighboring cell, UE1 sends a Radio Resource Control (RRC) connection request message, e.g., RRC Connection Reestablishment Request, e.g., to cell4 of RN2, where cell4 has been selected by UE1 as being the best cell of the neighboring cells. The cell selection/reselection is done, for example, by following standard procedures as defined in 3GPP 36.304. Based on the contents of the received RRC Connection Reestablishment Request, which may include the Physical Cell Identity (PCI) of cent cell4 may guess the identity of the RN that was controlling cent e.g., RN1. In response, cell4 sends to RN1 a message (e.g., a Context Fetch Request message via an X2 interface) asking RN1 to provide the UE context of UE1 to RN2. RN1 will then provide to RN2 the UE1 context, e.g., via a Context Fetch Response. After acknowledging the receipt of the Context Fetch Response message, e.g., via a Context Fetch Response Accept message, RN2 acknowledges/accepts the call reestablishment that was triggered by UE1 by sending a connection reestablishment message, e.g., the RRC Connection Reestablishment, to UE1. UE1 acknowledges the receipt of the RRC Connection Reestablishment message by sending a connection complete message, e.g., an RRC Connection Reestablishment Complete message, to RN2. Note that after this first stage, the second stage of the call reestablishment consists of RN2 establishing a connection with the Core network for UE1, which is omitted from this discloser for simplicity.

The connection reestablishment procedure of FIG. 3 works fine when the radio connection loss with the serving cell is lost due to radio conditions, interference, etc. However, the reestablishment procedure of FIG. 3 does not work when the radio connection is lost due to an outage of the serving cell. More particularly, immediately after cell1 goes into outage, whether that outage was unexpected or expected, current standards require RN1 to clear all contexts of all wireless terminals served before the outage by cell1. As a result, all wireless terminals that were served by cell1 will go into idle mode because RN1 clears all contexts for these wireless devices, which prevents RN1 from providing the contexts to another cell or RN, e.g., responsive to a connection reestablishment request. For example, suppose that UE1 is among the many calls being served by cell1. Suppose that after a radio outage in cent UE1 tries to re-establish its connection with a neighbor of cent e.g., cell4. In this case, as shown in FIG. 3, when UE1 sends an RRC Connection Reestablishment Request to cell4, the Context Fetch Request/Response procedure will fail because cell1 is experiencing an outage, and RN1 no longer has the contexts to send to cell4 or RN2. As a result, the RRC Connection Reestablishment Request will be rejected, and UE1 will go into an idle mode.

The solution presented herein solves these problems by enabling the serving RN 110 retain and to provide the contexts to one or more neighbor RNs 120 after an outage occurs. In so doing, the solution presented herein enables wireless terminals 140 served by the serving cell before the outage to reestablish connection with a neighbor cell, either in the serving RN 110 or in a neighbor RN (120). As used herein, a context comprises information used to maintain and/or establish wireless communications in the wireless network for the corresponding wireless terminal. Information provided by each context includes, but is not limited to, an identifier for the corresponding wireless terminal and an identifier for the serving cell. Further, the solution presented herein is applicable when the serving and neighbor RNs 110, 120 operate according to the same Radio Access Technology (RAT), and when the RAT controlling the serving RN 110 is different than the RAT controlling the neighbor RN 120.

As used herein, "neighbor cell" refers to a cell having a coverage area that at least partially overlaps that of the serving cell or which is adjacent to or sufficiently proximate the serving cell. Further, as used herein, "neighbor RN" refers to an RN for at least one neighbor cell. It will be appreciated that all cells in a neighbor RN may not be a neighbor cell.

Figure 4:
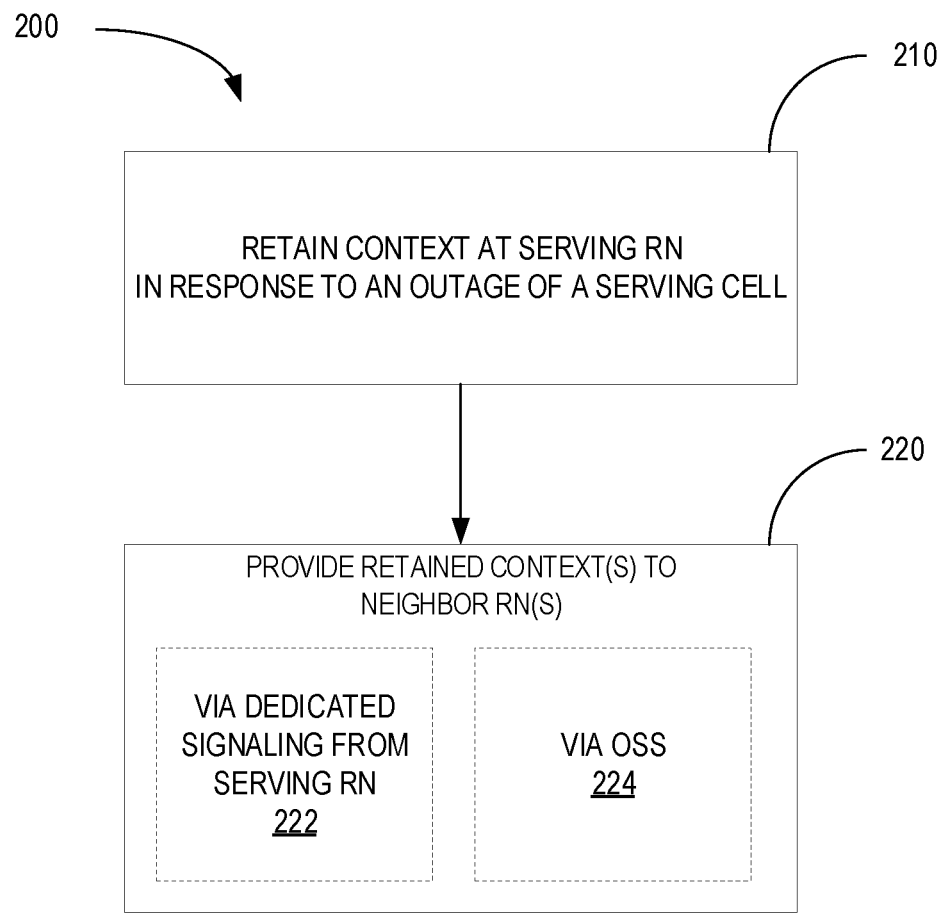
FIG. 4 shows an exemplary method according to the solution presented herein as implemented by the serving RN.

FIG. 4 shows an exemplary method 200 from the perspective of the serving RN 110. The method 200 comprises the serving RN 110 retaining one or more contexts in response to an outage of a serving cell in the serving RN 110 (block 210). For example, the serving RN 110 may store each context in a temporary memory 116 of the serving RN 110. Such temporary memory 116 may generally be part of the RN 110 or may more particularly be part of the DU 114, as shown in FIG. 1. Each retained context corresponds to a particular one of the active wireless terminals 140 served before the outage by the serving cell. The serving RN 110 provides at least one of the retained contexts to at least one neighbor RN 120 to facilitate connection reestablishment between the corresponding active wireless terminal 140 and a neighbor cell, e.g., of the serving RN 110 or a neighbor RN 120 (block 220). As discussed further herein, the serving RN 110 may provide the context(s) to the neighbor RNs 120 via dedicated signaling (block 222) or via the OSS 130 (block 224), as shown in FIG. 1.

Figure 5:
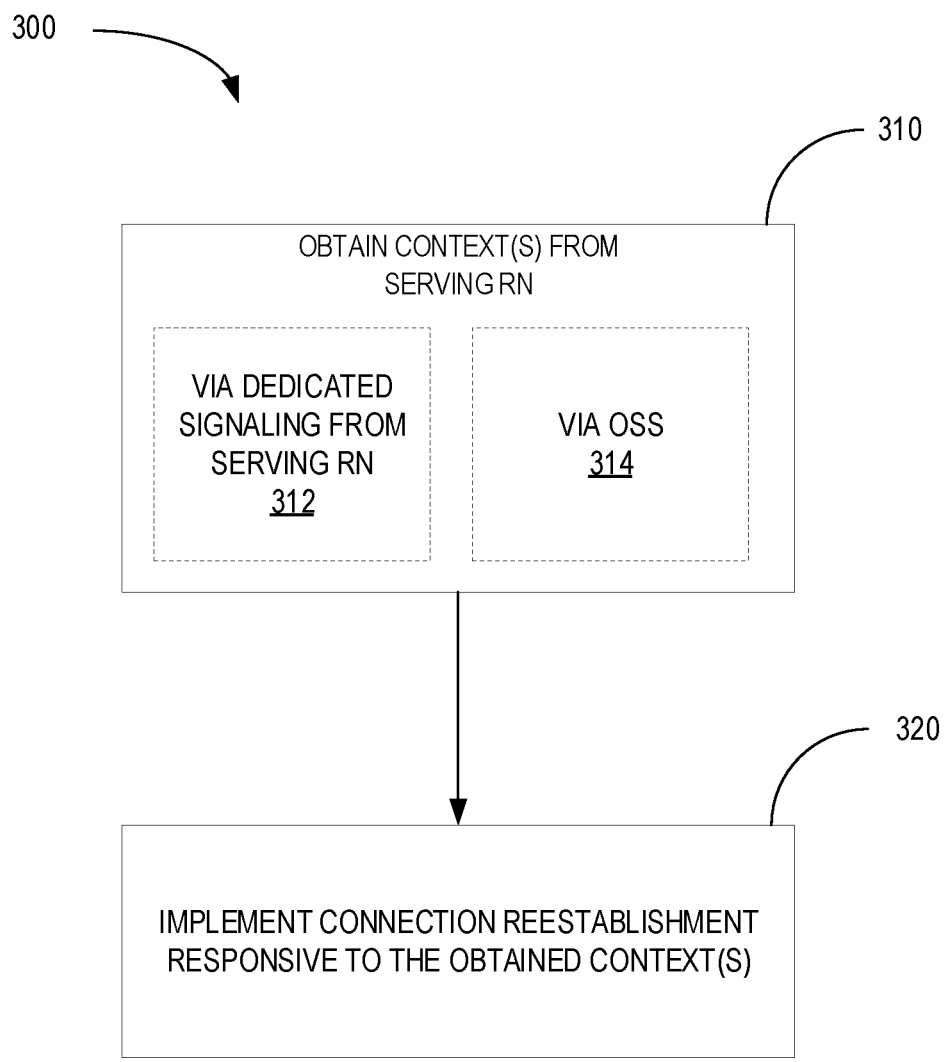
FIG. 5 shows an exemplary method according to the solution presented herein as implemented by the neighbor RN.

FIG. 5 shows an exemplary method 300 from the perspective of a neighbor RN 120. The method 300 comprises the neighbor RN 120 obtaining from the serving RN 110 a context for each of one or more wireless terminals 140 served by a serving cell in the serving RN 110 in response to an outage of the serving cell (block 310). As discussed further herein, the neighbor RN 120 may obtain the context(s) from the serving RN 110 via dedicated signaling (block 312) or via the OSS 130 (block 314). In other embodiments, the neighbor RN 120 may obtain each context from the corresponding wireless terminal 140. The neighbor RN 120 implements connection reestablishment with at least one of the active wireless terminals 140 using the obtained corresponding context (block 320). For example, the neighbor RN 120 may implement connection reestablishment by acknowledging a connection reestablishment with at least one of the active wireless terminals 140 using the corresponding context. Alternatively, the neighbor RN 120 may implement connection reestablishment by having one of the cells in the neighbor RN 120 ask at least one of the active wireless terminals 140 to initiate the connection reestablishment using the corresponding context.

Figure 6:
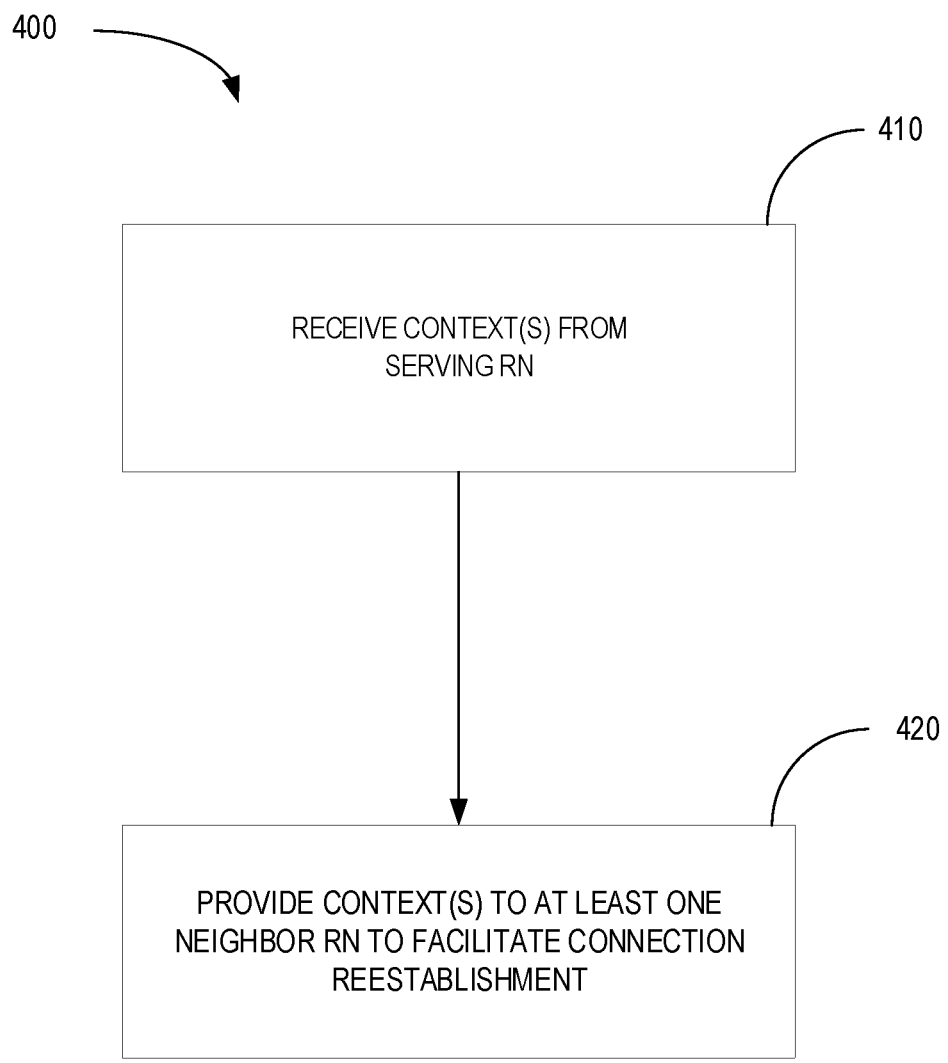
FIG. 6 shows an exemplary method according to the solution presented herein as implemented by the OSS.

FIG. 6 shows an exemplary method 400 from the perspective of the OSS 130. In response to an outage of a serving cell in the serving RN, the method 400 comprises the OSS 130 receiving, from the serving RN 110, a context for each of the wireless terminal(s) 140 served by the serving cell before the outage (block 410). The OSS 130 provides at least one of the received contexts to at least one of the neighbor RNs 120 to facilitate connection reestablishment between the corresponding active wireless terminal 140 and a neighbor cell of the serving RN 110 or of the neighbor RNs 120 (block 420).

Figure 7:
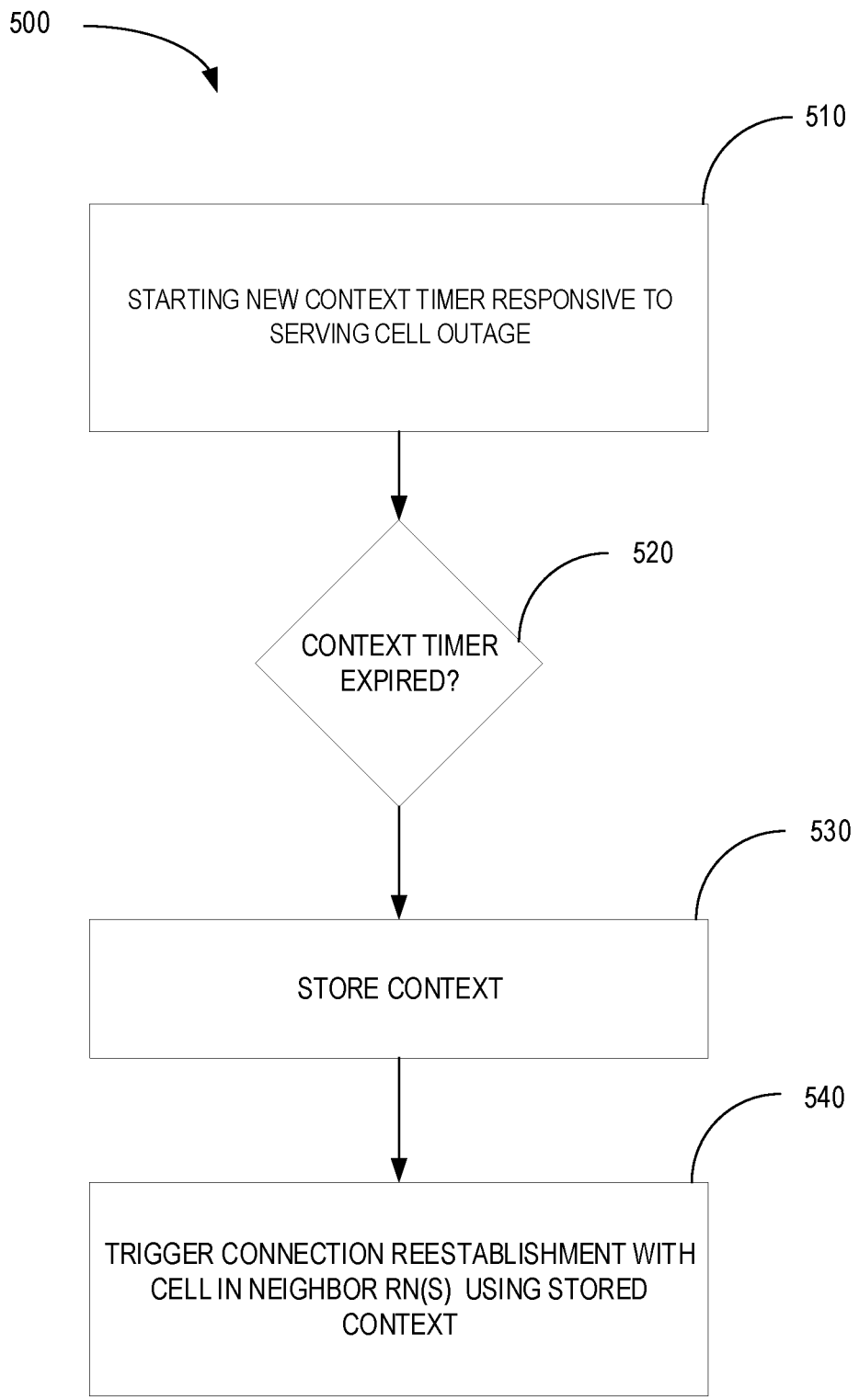
FIG. 7 shows an exemplary method according to the solution presented herein as implemented by the wireless terminal.

FIG. 7 shows an exemplary method 500 from the perspective of an active wireless terminal 140 served by a serving cell of a serving RN 110 before an outage. In response to an outage of the serving cell, the wireless terminal 140 starts a new context timer 148 (FIG. 8(C)) in the wireless terminal 140 (block 510). The new context timer 148 has a duration less than a radio link failure timer, e.g., the T311 timer controlled by the wireless network 100. Responsive to expiration of the new context timer 148, the wireless terminal 140 stores its context, which comprises information specific to the wireless terminal 140 for maintaining connections in the wireless network 100 (block 530), and triggers connection reestablishment with a neighbor cell in the serving RN 110 or a neighbor RN 120 using the stored context (block 540).

The methods of FIGS. 4-7 collectively represent the solution presented herein, which generally requires some network entity retaining, after an outage of the serving cell, the context (or contexts) for the wireless terminals 140 served before the outage by the serving cell. In so doing, the solution presented herein maintains the ability for the wireless terminals 140 to reestablish the connection with a neighbor cell even after an outage, and even if that outage is unexpected.

Figure 8:
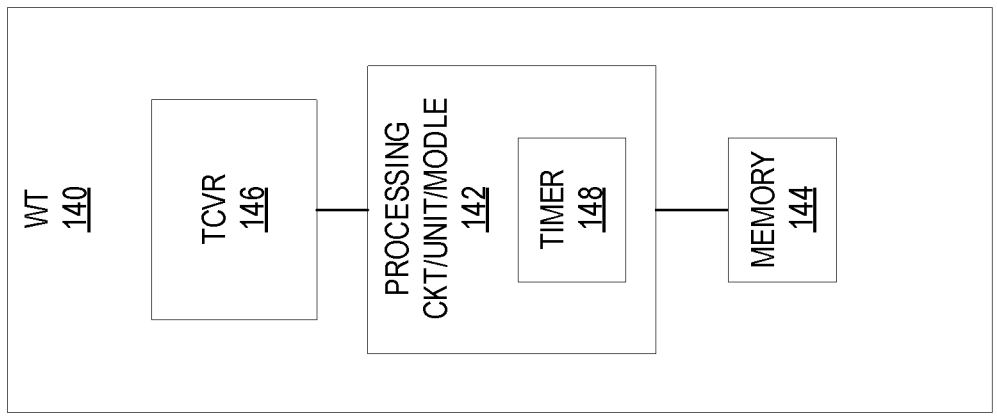
FIG. 8(A) shows a block diagram for an exemplary RN according to the solution presented herein.
FIG. 8(B) shows a block diagram for an exemplary OSS according to the solution presented herein.
FIG. 8(C) shows a block diagram for an exemplary wireless terminal according to the solution presented herein.
Figure 8:
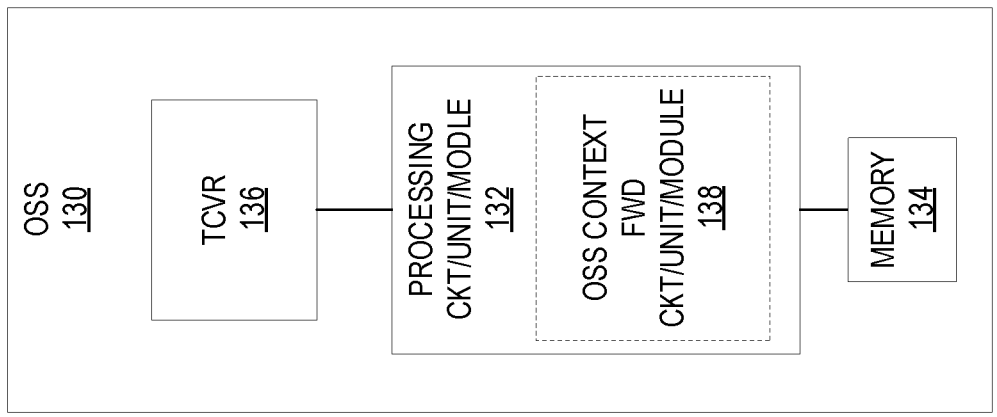
Figure 8:
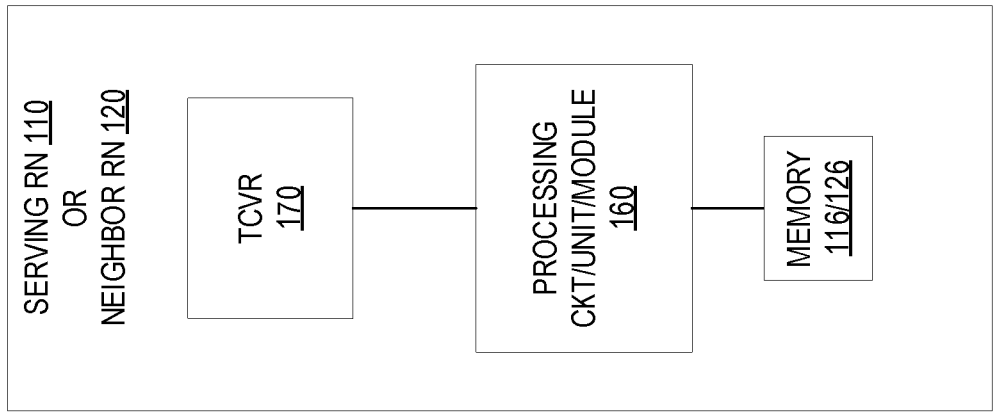

FIGS. 8(A)-8(C) show exemplary block diagrams of the RNs 110, 120, OSS 130, and wireless terminal 140 for the solution disclosed herein. The RN 110, 120 of FIG. 8(A) represents a serving RN 110 and/or a neighbor RN 120, and comprises the memory 116, 126, a processing circuit/unit/module 160, and a transceiver 170. The memory 116, 126 stores any software instructions for the processing circuit/module/unit 160, as well as any contexts for the wireless terminals 140, as discussed herein. The processing circuit/unit/module 160 implements the steps of the corresponding RN methods, as disclosed herein. For example, the processing circuit/unit/module 160 of a serving RN 110 executes the steps of method 200 of FIG. 4, while the processing circuit/unit/module 160 of a neighbor RN 120 executes the steps of method 300 of FIG. 5. Transceiver 170 encompasses the circuitry for any wired and/or wireless communications necessary for the operation of the serving RN 110 and the neighbor RNs 120, e.g., wireless communications with the wireless terminals 140, signaling between the serving and neighbor RNs 110, 120, signaling between the RNs 110, 120 and the OSS 130, etc.

The OSS 130 of FIG. 8(B) comprises a processing circuit/unit/module 132, memory 134, and a transceiver 136. The memory 134 stores any software instructions for the processing circuit/module/unit 134, as well as any received contexts for the wireless terminals 140, as discussed herein. The processing circuit/unit/module 134 implements the steps of the corresponding OSS method, as disclosed herein. For example, the processing circuit/unit/module 132 executes the steps of method 400 of FIG. 6. Transceiver 170 encompasses the circuitry for any communications necessary for the operation of the OSS 130, e.g., communications with the serving RN 110 and/or the neighbor RNs 120. As shown in FIG. 8(B), the processing circuit/unit/module 132 may include an OSS context forwarding circuit/unit/module 138 configured to forward any received contexts to the neighbor RN(s) 120.

The wireless terminal 140 of FIG. 8(C) comprises a processing circuit/unit/module 142, memory 144, and a transceiver 146. The memory 144 stores any software instructions for the processing circuit/module/unit 142, as well as the wireless terminal's context, as discussed herein. The processing circuit/unit/module 142 implements the steps of the corresponding wireless terminal method, as disclosed herein. For example, the processing circuit/unit/module 142 executes the steps of method 500 of FIG. 7. Transceiver 146 encompasses the circuitry for any wired and/or wireless communications necessary for the operation of the wireless terminal 140, e.g., wireless communications with the cells. As shown in FIG. 8(C), the processing circuit/unit/module 142 may include timer 148 configured to count down a predetermined amount of time, which is less than the amount of time for the timer set by the network 100, in the event of an outage of the serving cell. By setting the context timer 148 to a time less than the radio link failure time set by the network, the solution presented herein enables the wireless terminal 140 to accelerate the connection reestablishment in the event of an outage. In fact the radio link failure time set by the network, e.g., for the T311 timer, is defined by an operator in the network, and typically deals with radio link failure that occurs progressively, e.g., as a result of a subscriber moving slowly towards an area with bad or no coverage (e.g., when a subscriber moves underground). The times set for such timers is typically long, e.g., so as to allow time for the subscriber to move back into a better coverage area naturally. For the solution presented herein, which deals with a sudden loss of coverage due to an outage, which in general is not dependent on the subscriber's movement, the wireless terminal 140 may set a different timer, e.g., the context timer 148, to a shorter time value, to enable the wireless terminal 140 to reestablish connection more quickly. For example, the network may set the T311 timer to a 3000 ms time value, while the wireless terminal 140 may set the context timer 148 to a 400 ms time value. Thus, per the solution presented herein, the wireless terminal 140 may be equipped with two timers, where one set to a time defined by the network 100 based on normal loss of radio coverage, and one set to a time defined by the wireless terminal 140 based on sudden loss of radio coverage.

In some embodiments, the serving RN 110 provides the context(s) to the neighbor RNs 120 via dedicated signaling, e.g., between a DU 114 of the serving RN 110 and a DU 124 of at least one neighbor RN 120. For example, the serving RN 110 may signal a handover request to the neighbor RNs 120, e.g., an X2AP handover request, where the handover request carries the context(s) for the active wireless terminals 140 that were served by the serving cell before the outage. In other embodiments, the serving RN 110 may provide the context(s) to the neighbor RNs 120 via the OSS 130. For example, a DU 114 of the serving RN 110 may forward the retained context(s) to the OSS 130, which then forwards the received context(s) to a DU 124 of at least one neighbor RN 120.

In some embodiments, the serving RN 110 and/or OSS 130 may provide the retained/obtained context(s) to all neighbor RNs 120 having a neighbor cell. In other embodiments, the serving RN 110 and/or the OSS 130 may provide the context(s) to a selected subset of the neighbor RNs 120, where the DU 114 of the serving RN 110 or the OSS 130 selects the subset responsive to a selection criteria. For example, the OSS 130 or the DU 114 of the serving RN 110 may select the subset responsive to a load condition. In this case, the context(s) are only provided to the neighbor RNs 120 that satisfy the load condition, and thus that presumably have the capacity (or more capacity) to handle the load associated with the wireless terminals 140 previously served by the serving cell now experiencing the outage. The subset of neighbor RNs 120 may also or alternatively be selected based on the RAT controlling the neighbor RNs 120. For example, to minimize the likelihood of degraded performance, the subset of neighbor RNs 120 may be selected to be the neighbor RNs 120 that operate according to the same RAT as the serving RN 110, e.g., 5G. In another example, to improve the performance, the subset of neighbor RNs 120 may be selected to be the neighbor RNs 120 that operate according to a more advanced RAT, e.g., 5G, than the RAT controlling the serving RN 110, e.g., 4G.

The following provides further details regarding various exemplary implementations for the solution presented herein.

Figure 9:
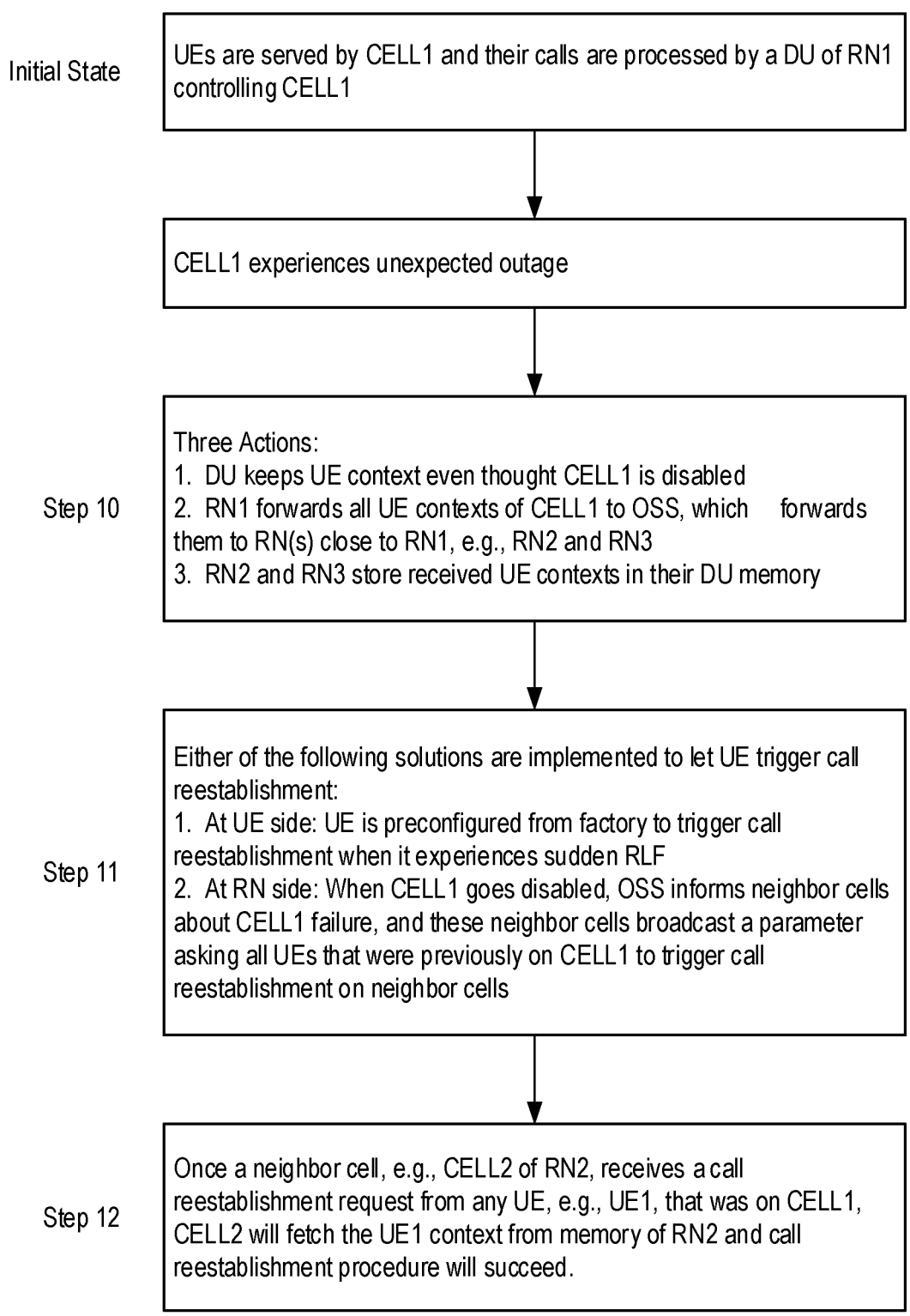
FIG. 9 shows an exemplary method according to the solution presented herein.

FIG. 9 shows one exemplary implementation of the solution presented herein. Each RN is usually composed of two types of multiple modules. One module is called a Radio Unit (RU), and the other is called a Digital Unit (DU). Each cell is dedicated to one or more RUs, which comprises an electronic module that has two main roles:

RU first role: In one direction, it converts the analogue radio signal coming from the UE on the air interface into a digital signal to be processed by the RN. In the opposite direction, the RU converts the digital signal coming from the RN into an analogue signal to be sent to the UE on the air interface.

RU second role: It works as a power amplifier as it amplifies the power of the analogue radio signal that is sent to the UE over the air interface. The most common used RU has a maximum capacity of, e.g., 160 Watts.

Note that one cell is composed of one or more RUs. More RUs per cell means more available radio power (Watts) for that cell. For simplicity, suppose that one cell, cell1 of one RN, RN1, is composed of one RU. If that RU goes down for any reason, e.g., a hardware or software outage, then cell1 will go into an outage and will stop processing calls.

The DU performs almost all other the activities of the RN. For example, the DU process everything related to a call at all protocol layers: layer 1, layer 2 and layer 3, etc., e.g., the DU handles UE call establishment, UE ciphering, UE mobility on the air interface, UE scheduling etc. Because the DU handles most functions of the RN, the DU holds the UE context for every UE being handled by any cell controlled by that DU. Note that the DU handles more than one cell, where the maximum number of cells depends on the hardware and software capacities of the DU.

In Step 10 of FIG. 9, the UE contexts of the serving cell, which has experienced an outage, are transferred to a neighboring RN. More particularly, when cell1 experiences an outage, the following actions are triggered:
1. The DU retains all of the UE contexts.
2. The DU of the serving RN forwards all retained UE contexts stored in its memory to neighbor RNs. This is done directly via dedicated signaling between the serving RN and the neighbor RN(s), or indirectly by the serving RN forwarding the retained contexts to the OSS. The OSS then checks all the neighbor RNs that are adjacent to the serving RN within a certain predefined distance, e.g. RN2 and RN3, then forwards the UE contexts of cell1 to these neighbor RNs. This function of the OSS may be performed by an OSS context forwarding unit/circuit/module 138.
3. The neighbor RNs, e.g., RN2 and RN3, store the received UE contexts in their DU memory (126).

In step 11 of FIG. 9, the UE triggers a call reestablishment after cell outage. In conventional solutions, a radio link is declared as failed as follows: If the UE experiences a predefined number, denoted N310, of what is called out-of-sync in 3GPP specification, then a network timer T310 is started, at the end of this T310 timer expiry a radio link is declared as failed. Note that by out-of-sync is meant a predefined number, e.g., 20, subframes of consecutive PDCCH (Physical Downlink Control Channel) decoding failure. In the solution presented herein, the UE is informed that whenever it loses suddenly its radio connection, it has to keep its UE context and tries to reestablish its call on any neighbor cell. Such information, denoted INFO1, is conveyed to the UE in one of following ways.

INFO1 is coded in the UE software, e.g., a vendor specific info. In such case the decision of triggering call reestablishment is taken at the UE side without any support from the network.

INFO1 is broadcasted by the neighboring cells of cell1 after cell1 has gone into outage. In such case the decision on whether the UE has to trigger or not call re-establishment is taken at the network side. With such feature the network has the option of controlling the triggering of call re-establishment, e.g. switch it off or one when desired.

In step 12 of FIG. 9, a UE, e.g. UE1, that has lost its radio connection with cent reestablishes its call on a neighbor cell, e.g., cell2 of RN2. Then cell2 will fetch the context for UE1 from the memory 126 of the DU 124 in RN2, and the call is successfully be reestablished.

Figure 10:
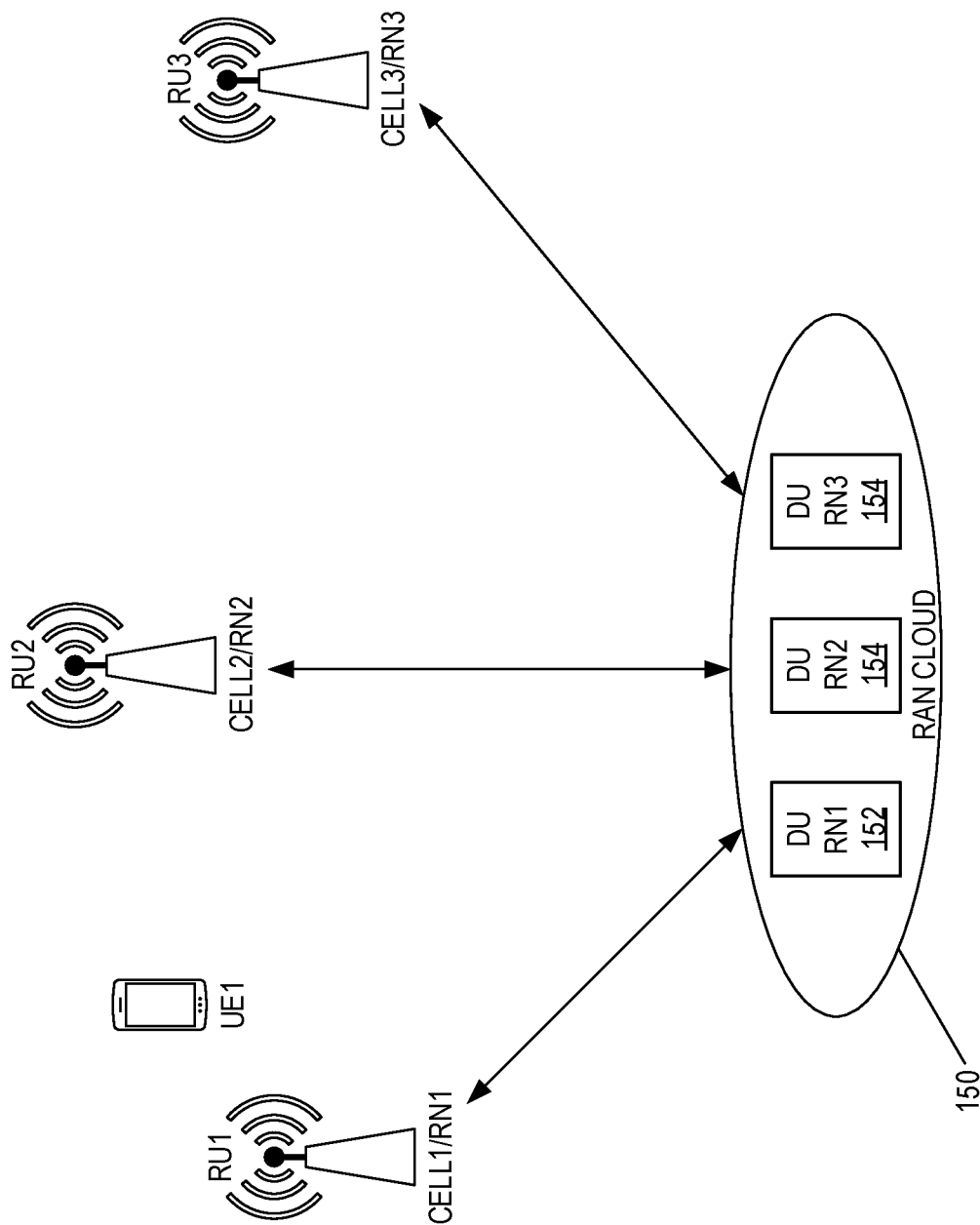
FIG. 10 shows an exemplary cloud implementation of the solution presented herein.

FIG. 10 shows one exemplary embodiment of the solution presented herein as implemented via the cloud 150. In this embodiment, the contexts may be conveyed via the cloud 150. For example, with C-RAN (Cloud Radio Access Network), all DUs are running on the same or on a nearby machines located in the same data center. The DU in the cloud 150 will then communicate with the RU located on site near the antennas. In this embodiment, all UE contexts located on DU 152 of the serving RN 110, e.g., RN1, are transferred, via software command (e.g., copy/paste file) from the DU 152 of RN1 to the DU(s) 154 of the neighbor RN(s) 120, where each DU 154 stores the received contexts in its memory. Subsequently, any of the various embodiments discussed herein may be used.

The solution presented herein provides multiple advantages over conventional outage response techniques. First, the solution presented herein prevents wireless terminals served by a serving cell experiencing an outage from losing their connection with the network. Further, because the solution presented herein only occurs in response to an outage, the solution presented herein avoids unnecessary signaling, e.g., such as signaling performed periodically in response to the possibility of some outage. Further still, the solution presented herein enables only the forwarding of a limited number of contexts, e.g., only those contexts for wireless terminals that may benefit from connection to a neighbor cell of a neighbor RN, instead of all of the contexts. Thus, the solution presented herein reduces signaling overhead for this reason as well. Further, the solution presented herein enables the neighbor cell to be selected based on the controlling RAT, which improves performance by enabling the connection reestablishment to be with a neighbor cell of the same RAT as, or a more advanced RAT than, the serving cell.

As used herein, the term "wireless terminal" may include a cellular radiotelephone with or without a multi-line display; a Personal Communication System (PCS) terminal that may combine a cellular radiotelephone with data processing, facsimile, and data communications capabilities; a Personal Digital Assistant (PDA) that can include a radiotelephone, pager, Internet/intranet access, web browser, organizer, calendar, and/or a global positioning system (GPS) receiver; and a conventional laptop and/or palmtop receiver or other appliance that includes a radiotelephone transceiver. Wireless terminals may also be referred to as "pervasive computing" devices.

As used herein, "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Various elements disclosed herein are described as some kind of circuit, e.g., a processing circuit, memory, transceiver, forwarding circuit, timer, etc. Each of these circuits may be embodied in hardware and/or in software (including firmware, resident software, microcode, etc.) executed on a controller or processor, including an application specific integrated circuit (ASIC). Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Furthermore, the present invention may take the form of a computer program product on a computer-usable or computer-readable storage medium having computer usable or computer-readable program code embodied in the medium for use by or in connection with an instruction execution system, where the processing circuit executes the code. In the context of this document, a computer-usable or computer-readable medium may be any medium that can contain, store, communicate, propagate, or transport the program for use by or in connection with the instruction execution system, apparatus, or device, and may comprise a non-transitory computer-readable medium. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

The following details multiple embodiments of the solution presented herein.

One exemplary embodiment comprises a method of maintaining wireless communications after a cell outage in a wireless network comprising a serving Radio Node (RN) and neighbor RNs. The method is implemented by the serving RN and comprises, in response to an outage of a serving cell in the serving RN, retaining a context for each of one or more active wireless terminals served by the serving cell before the outage. Each context comprises information used to maintain wireless communications in the wireless network for a specific one of the active wireless terminals. The method further comprises providing at least one of the retained contexts to at least one of the neighbor RNs to facilitate connection reestablishment between the corresponding active wireless terminal and a neighbor cell of the serving RN or the neighbor RNs.

In one exemplary, embodiment, said retaining comprises storing, in response to the outage, the context for each of the one or more active wireless terminals in a temporary memory of the serving RN. In one exemplary embodiment, the serving RN comprises a digital unit and one or more radio units, the serving RN comprises at least the serving cell, wherein the serving cell corresponds to at least one of the one or more radio units, the outage comprises an outage of all of the radio units of the serving cell, and said storing comprises storing, in response to the outage, the context for each of the one or more active wireless terminals in a memory of the digital unit of the serving RN.

In one exemplary embodiment, said providing comprises forwarding at least one of the retained contexts from the serving RN to an Operating Support System (OSS) to provide the at least one of the retained contexts to the at least one of the neighbor RNs. In one exemplary embodiment, the serving RN comprises a digital unit and one or more radio units, the serving RN comprises at least the serving cell, wherein the serving cell corresponds to at least one of the one or more radio units, the outage comprises an outage of all of the radio units of the serving cell, and said forwarding comprises the digital unit of the serving RN forwarding at least one of the retained contexts to the OSS.

In one exemplary embodiment, said providing comprises sending dedicated signaling from the serving RN to at least one of the neighbor RNs, said dedicated signaling including the at least one of the retained contexts. In one exemplary embodiment, the dedicated signaling comprises a handover request used to carry the contexts for the active wireless terminals that were served by the serving cell before the outage.

In one exemplary embodiment, at least part of the serving RN and one or more of the neighbor RNs are implemented in a cloud in the wireless network, the cloud comprises a first digital unit for the serving RN and a second digital unit for each of the neighbor RNs, and said providing comprises copying at least one of the retained contexts from the first digital unit to at least one of the second digital units.

In one exemplary embodiment, said providing comprises providing at least one of the retained contexts from the serving RN to a selected subset of the neighbor RNs to facilitate connection reestablishment between the corresponding active wireless terminal and a neighbor cell in the selected subset, said selected subset comprising one or more of the neighbor RNs satisfying a selection criteria. In one exemplary embodiment, the selection criteria comprises a load condition. In one exemplary embodiment, the serving RN (110) comprises a digital unit and one or more radio units, and wherein the digital unit selects the subset responsive to the selection criteria.

In one exemplary embodiment, each context comprises at least an identifier for the corresponding active wireless terminal and an identifier for the serving cell.

In one exemplary embodiment, the outage comprises an unexpected hardware or software outage of the serving cell.

In one exemplary embodiment, at least one of the neighbor RNs operates according to the same radio access technology as the serving RN.

In one exemplary embodiment, at least one of the neighbor RNs operates according to a radio access technology more advanced than a radio access technology used by the serving RN.

In one exemplary embodiment, a serving Radio Node (RN) for wireless communication in a wireless network, where the serving RN comprises a processing circuit configured to carry out any steps of the serving RN method.

In one exemplary embodiment, a computer program product controls a serving Radio Node (RN) in a wireless network. The computer program product comprising software instructions which, when run on at least one processing circuit in the serving RN, causes the serving RN to execute any steps of the serving RN method. A computer-readable medium may comprise the serving RN computer program product. The computer-readable medium may comprise a non-transitory computer readable medium.

One exemplary embodiment comprises a method of maintaining wireless communications after a cell outage in a wireless network comprising a serving Radio Node (RN) and a neighbor RN. The method is implemented by the neighbor RN and comprises, in response to an outage of a serving cell in the serving RN, obtaining a context for each of one or more active wireless terminals served by the serving cell before the outage, each context comprising information used to maintain wireless communications in the wireless network for a specific one of the active wireless terminals. The method further comprises implementing connection reestablishment with at least one of the one or more active wireless terminals using the obtained corresponding context.

In one exemplary embodiment, said implementing comprises cells in the neighbor RN asking one or more of the active wireless terminals to initiate the connection reestablishment with at least one cell in the neighbor RN using the corresponding context.

In one exemplary embodiment, said implementing comprises triggering a connection reestablishment with at least one of the active wireless terminals in a cell of the neighbor RN using the corresponding context.

In one exemplary embodiment, said obtaining comprises receiving, in response to the outage, the context for at least one of the one or more active wireless terminals from the serving RN. In one exemplary embodiment, said obtaining (310) comprises receiving, in response to the outage, the context for at least one of the one or more active wireless terminals from the serving RN via an Operating Support System (OSS) supporting the serving RN and the neighbor RN.

In one exemplary embodiment, said obtaining comprises receiving, in response to the outage, the context for at least one of the one or more active wireless terminals from at least one of the active wireless terminals. In one exemplary embodiment, said receiving comprises receiving, in response to the outage, a connection reestablishment request with the corresponding context from at least one of the active wireless terminals upon expiration of a context timer in the corresponding active wireless terminal.

In one exemplary embodiment, each context comprises at least an identifier for the corresponding active wireless terminal and an identifier for the serving cell.

In one exemplary embodiment, the outage comprises an unexpected outage.

In one exemplary embodiment, the neighbor RN operates according to the same radio access technology as the serving RN. In one exemplary embodiment, the neighbor RN operates according to a radio access technology more advanced than a radio access technology used by the serving RN.

In one exemplary embodiment, a neighbor Radio Node (RN) in a wireless network comprising a serving RN and the neighbor RN comprises a processing circuit configured to carry out any steps of the neighbor RN method.

In one exemplary embodiment, a computer program product controls a neighbor Radio Node (RN) in a wireless network. The computer program product comprises software instructions which, when run on at least one processing circuit in the neighbor RN, causes the neighbor RN to execute any steps of the NR method. In one exemplary embodiment, a computer-readable medium comprises the computer program product. In one exemplary embodiment, the computer-readable medium comprises a non-transitory computer readable medium.

One exemplary embodiment comprises a method of maintaining wireless communications after a cell outage in a wireless network comprising a serving Radio Node (RN) and neighbor RNs. The method is implemented by an active wireless terminal served by a serving cell in the serving RN and comprises, responsive to determining an outage of the serving cell in the serving RN, starting a context timer in the active wireless terminal, said context timer having a duration less than a radio link failure timer controlled by the wireless network. The method further comprises, responsive to expiration of the context timer, storing a context comprising information specific to the active wireless terminal used to maintain wireless communications in the wireless network, and triggering connection reestablishment with a neighbor cell in the serving RN or a neighbor RN using the stored context.

In one exemplary embodiment, the stored context comprises an identifier for the active wireless terminal and an identifier of the serving cell.

In one exemplary embodiment, at least one of the neighbor RNs operates according to the same radio access technology as the serving RN. In one exemplary embodiment, at least one of the neighbor RNs operates according to a radio access technology more advanced than a radio access technology used by the serving RN.

In one exemplary embodiment, a wireless terminal served by a serving cell in a serving RN comprises a processing circuit configured to carry out any steps of the wireless terminal method.

In one exemplary embodiment, a computer program product controls a wireless terminal served by a serving cell in a serving RN in a wireless network. The computer program product comprises software instructions which, when run on at least one processing circuit in the wireless terminal, causes the wireless terminal to execute any steps of the wireless terminal method. In one exemplary embodiment, a computer-readable medium comprises the computer program product. In one exemplary embodiment, the computer-readable medium comprises a non-transitory computer readable medium.

One exemplary embodiment comprises a method of maintaining wireless communications after a cell outage in a wireless network. The method is implemented by an Operating Support System (OSS) supporting a serving RN and neighbor RNs. The OSS method comprises, in response to an outage of a serving cell in the serving RN, receiving from the serving RN a context for each of one or more active wireless terminals served by the serving cell before the outage, each context comprising information used to maintain wireless communications in the wireless network for a specific one of the active wireless terminals. The OSS method further comprises providing at least one of the received contexts to at least one of the neighbor RNs to facilitate connection reestablishment between the corresponding active wireless terminal and a neighbor cell of the serving RN or the neighbor RNs.

In one exemplary embodiment, said providing comprises providing at least one of the received contexts to a selected subset of the neighbor RNs to facilitate connection reestablishment between the corresponding active wireless terminal and one of the neighbor cells in the selected subset, said selected subset comprising one or more of the neighbor RNs having at least one cell satisfying a selection criteria. In one exemplary embodiment, the selection criteria comprises a load condition.

In one exemplary embodiment, each received context comprises at least an identifier for the corresponding active wireless terminal and an identifier for the serving cell.

In one exemplary embodiment, the outage comprises an unexpected outage.

In one exemplary embodiment, at least one of the neighbor RNs operates according to the same radio access technology as the serving RN. In one exemplary embodiment, at least one of the neighbor RNs operates according to a radio access technology more advanced than a radio access technology used by the serving RN.

In one exemplary embodiment, an Operating Support System (OSS) supporting a serving Radio Node (RN) and adjacent neighbor RNs comprises a processing circuit configured to carry out any steps of the OSS method.

In one exemplary embodiment, a computer program product controls an Operating Support System (OSS) supporting a serving Radio Node (RN) and neighbor RNs in a wireless network. The computer program product comprises software instructions which, when run on at least one processing circuit in the OSS, causes the OSS to execute any steps of the OSS method. In one exemplary embodiment, a computer-readable medium comprises the computer program product. In one exemplary embodiment, the computer-readable medium comprises a non-transitory computer readable medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of maintaining wireless communications after a cell outage in a wireless network comprising a serving Radio Node (RN) and neighbor RNs, the method implemented by the serving RN and comprising:
   in response to an outage of a serving cell in the serving RN, retaining a context for each of one or more active wireless terminals served by the serving cell before the outage, each context comprising information used to maintain wireless communications in the wireless network for a specific one of the active wireless terminals, the serving RN comprising a digital unit and one or more radio units, the serving RN comprising at least the serving cell, the serving cell corresponding to at least one of the one or more radio units, the outage comprising an outage of all of the radio units of the serving cell, the retaining comprising storing, in response to the outage, the context for each of the one or more active wireless terminals in a temporary memory of the digital unit;
   and providing at least one of the retained contexts to at least one of the neighbor RNs to facilitate connection reestablishment between the corresponding active wireless terminal and a neighbor cell of the serving RN or the neighbor RNs.

2. The method of claim 1 wherein said providing comprises forwarding at least one of the retained contexts from the serving RN to an Operating Support System (OSS) to provide the at least one of the retained contexts to the at least one of the neighbor RNs.

3. The method of claim 2 wherein:
   said forwarding comprises the digital unit of the serving RN forwarding at least one of the retained contexts to the OSS.

4. The method of claim 1 wherein:
   at least part of the serving RN and one or more of the neighbor RNs are implemented in a cloud in the wireless network;
   the cloud comprises a first digital unit for the serving RN and a second digital unit for each of the neighbor RNs; and
   said providing comprises copying at least one of the retained contexts from the first digital unit to the second digital unit of at least one of the neighbor RNs.

5. The method of claim 1 wherein said providing comprises providing at least one of the retained contexts from the serving RN to a selected subset of the neighbor RNs to facilitate connection reestablish ment between the corresponding active wireless terminal and a neighbor cell in the selected subset, said selected subset comprising one or more of the neighbor RNs satisfying a selection criteria.

6. The method of claim 1 wherein the outage comprises an unexpected hardware or software outage of the serving cell.

7. The method of claim 1 wherein at least one of the neighbor RNs operates according to the same radio access technology as the serving RN.

8. A serving Radio Node (RN) for wireless communication in a wireless network, the serving RN comprising a processing circuit configured to carry out the method of claim 1.

9. A non-transitory computer-readable medium comprising a computer program product for controlling a serving Radio Node (RN) in a wireless network, the computer program product comprising software instructions which, when run on at least one processing circuit in the serving RN, causes the serving RN to execute the method according to claim 1.

10. A method of maintaining wireless communications after a cell outage in a wireless network, the method implemented by an Operating Support System (OSS) supporting a serving RN and neighbor RNs, the method comprising:
   in response to an outage of a serving cell in the serving RN, receiving from the serving RN a context for each of one or more active wireless terminals served by the serving cell before the outage, each context comprising information used to maintain wireless communications in the wireless network for a specific one of the active wireless terminals; and
   providing at least one of the received contexts to at least one of the neighbor RNs to facilitate connection reestablishment between the corresponding active wireless terminal and a neighbor cell of the serving RN or the neighbor RNs, the providing comprising providing at least one of the received contexts to a selected subset of the neighbor RNs to facilitate connection reestablishment between the corresponding active wireless terminal and one of the neighbor cells in the selected subset, the selected subset comprising one or more of the neighbor RNs having at least one cell satisfying a selection criteria.

11. The method of claim 10 wherein the outage comprises an unexpected outage.

12. An Operating Support System (OSS) supporting a serving Radio Node (RN) and adjacent neighbor RNs), the OSS comprising a processing circuit configured to carry out the method of claim 10.

13. A non-transitory computer-readable medium comprising a computer program product for controlling an Operating Support System (OSS) supporting a serving Radio Node (RN) and neighbor RNs in a wireless network, the computer program product comprising software instructions which, when run on at least one processing circuit in the OSS, causes the OSS to execute the method according to claim 10.

* * * * *